United States Patent [19]

Fisk et al.

[11] Patent Number: 4,588,830
[45] Date of Patent: May 13, 1986

[54] ADDITION POLYMERIZABLE ADDUCTS FOR NONAQUEOUS DISPERSIONS

[75] Inventors: Thomas E. Fisk; Dwight K. Hoffman, both of Midland, Mich.

[73] Assignee: The Dow Chemical Company, Midland, Mich.

[21] Appl. No.: 448,082

[22] Filed: Dec. 9, 1982

[51] Int. Cl.$^4$ ............................................. C07F 7/28
[52] U.S. Cl. ...................... 556/52; 524/376; 556/440; 558/186
[58] Field of Search .............. 556/440; 260/952, 429, 260/429.5

[56] References Cited

U.S. PATENT DOCUMENTS

| | | | |
|---|---|---|---|
| 2,048,799 | 7/1936 | Lawson | 556/440 |
| 2,934,555 | 4/1960 | O'Brien et al. | 260/952 |
| 3,324,074 | 6/1967 | McManimie | 556/440 |
| 3,524,901 | 8/1970 | Najvar | 260/952 X |
| 3,855,364 | 12/1974 | Steckler | 260/952 |
| 3,867,351 | 2/1975 | Juna et al. | 260/952 |
| 3,879,498 | 4/1975 | Iliopulos et al. | 260/952 |
| 3,925,093 | 12/1975 | Walsh et al. | 556/440 X |
| 4,052,551 | 10/1977 | Huber et al. | 260/952 X |
| 4,062,693 | 12/1977 | Berger | 428/405 X |
| 4,119,682 | 10/1978 | Kleiner | 260/952 |
| 4,136,080 | 1/1979 | Berger | 523/203 |
| 4,151,154 | 4/1979 | Berger | 428/405 |
| 4,331,797 | 5/1982 | Martin | 556/440 X |

OTHER PUBLICATIONS

Chemical Abstracts 73 110509n (1970).
Chemical Abstracts 84 60042j (1976).
Chemical Abstracts 91 93097d (1979).

*Primary Examiner*—Helen M. S. Sneed

[57] ABSTRACT

An adduct of a heteroatomic monomer, e.g., gamma-methacryloxypropyl trimethoxysilane and a monoahl, e.g., a monohydroxyl polyalkylene oxide or a polyahl, e.g., a polypropylene glycol, is usefully employed in the preparation of stable copolymer dispersions of the type used in the production of polyurethane foams and polyurethane elastomers.

The copolymer dispersion is prepared by addition copolymerization of (1) the adduct with (2) ethylenically unsaturated monomer(s), e.g., styrene or mixture thereof with acrylonitrile, while (1) and (2) are dispersed or dissolved in an excess of a polyahl, i.e., an active hydrogen polyfunctional compound.

6 Claims, No Drawings

ADDITION POLYMERIZABLE ADDUCTS FOR NONAQUEOUS DISPERSIONS

BACKGROUND OF THE INVENTION

This invention relates to addition polymerizable adducts, to their use in the stabilization of nonaqueous dispersions and to urethane polymers prepared using such dispersions.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties, e.g., load bearing and processability, which are unacceptable for some applications, particularly for foam applications as well as for elastomer and plastic applications.

To improve such properties, it has been the practice of the art to employ graft copolymer dispersions (often called polymer polyols) prepared from vinyl monomers and polyols in the preparation of polyurethanes, e.g., as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. For example, as stated in U.S. Pat. No. 3,823,201 to Pizzini et al., "... the stability of dispersions obtained by the in situ polymerization of vinyl monomers in polyols is a result of the formation of surface stabilizing species. Without a stabilizing species which provides a repulsive barrier between the polymer particles, the polymerized material will agglomerate and form irregularly shaped lumps. ... the stabilizer is an amphipathic polymer consisting of lyophobic vinyl polymer and lyophilic polyether chains. The vinyl polymer part is absorbed and/or chemically built in the particle surface while the polyether part reaches out in the surrounding polyol phase providing a protective shield against coagulation."

Although it is desirable to have some unsaturation in the polyol, it has been found (e.g., U.S. Pat. No. 3,651,639 to Pizzini et al.) that larger mole ratios of unsaturation to polyol such as 1:1 to 3:1 cause unacceptably high viscosities in the resultant dispersions.

Accordingly, it is highly desirable to provide a nonaqueous copolymer dispersion exhibiting increased stability and reduced viscosities.

SUMMARY OF THE INVENTION

In one aspect, the present invention is an ethylenic addition polymerizable adduct which when polymerized acts as a stabilizer for a nonaqueous dispersion. This adduct comprises an addition polymerizable ethylenically unsaturated moiety bound through heteroatomic moiety as defined hereinafter to at least one lyophilic moiety.

In another aspect, this invention is a copolymerizate of the aforementioned adduct and at least one other addition polymerizable, ethylenically unsaturated monomer wherein the adduct is present in the copolymerizate in an amount sufficient to stabilize a dispersion of colloidal size particles of the copolymerizate in a nonaqueous liquid.

In addition to their usefulness in the preparation of polymer dispersions, the adduct and copolymerizate of the present invention are also useful for the stabilization of other nonaqueous dispersions, particularly nonaqueous coating systems and organic dispersions of barrier resins, as well as in the preparation of stabilizers, thixotropic agents and thickeners for aqueous dispersions such as latexes used in latex paints, etc. The adduct and copolymerizate are also useful in the preparation of lubricants, encapsulants, polishes, adhesives, and polymer powders.

In another aspect, the present invention is a polymer dispersion having improved stability. The dispersion comprises:

(A) a polyahl (as defined hereinafter) having dispersed therein, (B) an addition copolymerizate of (1) the aforementioned adduct and (2) at least one ethylenically unsaturated monomer; or (C) the reaction product of (1) a copolymer of an unsaturated heteroatomic monomer and at least one other ethylenically unsaturated monomer and (2) a monoahl (as defined hereinafter), a polyahl or mixture of monoahl and polyahl; or (D) a combination of (B) and (C); or (E) a combination of (B) and/or (C) and a polymer of at least one "other monomer", said copolymerizate and/or reaction product being present in an amount sufficient to stabilize the dispersion.

The terms "dispersed" or "dispersion" as used herein are generic to include dispersions wherein the disperse phase constitutes colloidal size particles as well as true solutions wherein the disperse phase is at the molecular level. A stabilized or stable dispersion is a dispersion in which the dispersed particles do not coalesce upon standing.

Surprisingly, the copolymer dispersions of the present invention exhibit excellent stability and low viscosity even at the relatively low concentrations of ethylenically unsaturated moieties existing in the adduct.

This invention, in yet another aspect, is a method for making the aforementioned copolymer dispersion. In yet a further aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinafter defined.

DETAILED DESCRIPTION OF REPRESENTATIVE EMBODIMENTS

The polyahl suitably employed as the continuous phase of the copolymer dispersion includes any organic compound having at least two active hydrogen moieties wherein the compound has a number average molecular weight ($M_n$) of at least 62. Preferably the polyahl is a polymer having at least two active hydrogen moieties, an $M_n$ of at least 200 and at least three repeating units of a monomeric moiety. Polyahls that are suitably employed in preparing the ethylenic addition polymerizable adduct or reaction product of this invention are also sufficiently lyophilic to enable polymers of the adduct to stabilize dispersions of lyophobic polymers in nonaqueous liquids. Preferably, the polyahl is sufficiently similar in composition to the continuous phase such that it is soluble in the continuous phase. For the purposes of this invention, an active hydrogen moiety refers to a moiety containing a hydrogen atom which, because of its position in the molecule, displays significant activity according to the Zerewitnoff test described by Woller in the *Journal of The American Chemical Society*, Vol. 49, p. 3181 (1927). Illustrative of such active hydrogen moieties are —COOH, —OH, —NH$_2$, =NH, —CONH$_2$, —SH and —CONH—. Typical polyahls include polyols, polyamines, polyamides, polymercaptans, polyacids and the like, particularly as exemplified in U.S. Pat. No. 3,928,299.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed in *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Shick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; alkyne thiols such as 3-hexyne-1,6-dithiol; and arene thiols such as 1,4-benzene dithiol. Other thiols suitable for this purpose are hydrogen sulfide as well as thiol functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-phenylene diamine, 1,5-diaminonaphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional poyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, maleic acid, furamic acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included within the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4'-hydroxyphenyl)sulfone.

Other polyahls suitably employed include polylactones; hydroxy functional acrylic polymers such as polymers of hydroxyethyl acrylate, hydroxyethyl methacrylate, hydroxypropyl acrylate and hydroxypropyl methacrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides; polyamines such as polyethyleneimines, polypropyleneimines and condensate polymers of aniline and formaldehyde; acrylamide polymers; amine-functional polyglycols; mercaptan-functional polyglycols and polyalkylene sulfides; carboxy-functional polymers such as polyacrylic acid and the like.

For the purposes of this invention, a monoahl is any organic compound that has one active hydrogen moiety per molecule and is sufficiently lyophilic to enable polymers of an adduct of a suitable heteroatomic monomer and the monoahl to stabilize a dispersion of a lyophobic polymer in a nonaqueous liquid. Preferably, the monoahl is soluble in the nonaqueous continuous phase of the dispersion, e.g., the polyahl. The active hydrogen moiety of the monoahl can contain one or two active hydrogens and is an active hydrogen moiety as defined hereinbefore for the polyahl. For the purposes of this invention, a monoahl is considered soluble in the continuous phase of the dispersion if at least 0.01 mole of the monoahl dissolves in a mole of the polyahl of the continuous phase to form a thermodynamically stable solution.

Examples of such monoahls include monohydric polyethers and monohydric polyesters which are similar in all respects to such polyols as defined hereinbefore except that monofunctional initiators such as monohydric alcohols are used as polymerization initiators instead of the polyfunctional initiators used to initiate polyol polyethers and polyol polyesters. Exemplary monohydric initiators include methanol, ethanol, butanol, and monohdyric glycol ethers such as tripropylene glycol methyl ether, as well as phenols, acids, mercaptans, and the like. Other suitable monoahls include monohydroxyl epoxy resins, monohydroxyl polyurethane polymers, monohydroxyl phosphorus compounds, alkylene oxide adducts of monohydric thioethers including polythioethers, monohydric acetals including polyacetals, as well as monomercaptans, N-methylolamides, monoamines, and other compounds which are similar to the aforementioned polyahls except that they contain only one active hydrogen moiety. Of the foregoing monoahls, the monohydric polyethers are preferred.

The ethylenic addition polymerizable adduct of this invention has (1) an ethylenically unsaturated moiety (U), (2) a heteroatomic moiety (M), and (3) at least one lyophilic moiety (A) represented by the formula:

$$U(M(A)_x(R)_z)_y$$

wherein R is hydrogen or an organic moiety covalently bonded to M; x is a number from 1 to 5, preferably 2 to 4, and most preferably 2 or 3; y is a number satisfying the valence of U, usually from 1 to 2, most preferably 1; and z is 0 or a number from 1 to 4. Exemplary unsaturated moieties (U) include acryloxy, methacryloxy, styryl, vinyl benzyl, allyl and similar monovalent radicals derived from maleic anhydride, fumaric acid, crotonic acid, halomaleic anhydride, unsaturated polyhydric alcohols such as 2-butene-1,4-diol, glycerol allylether, trimethylolpropane allylether, pentaerythritol allylether, pentaerythritol vinylether, and 1-butene-3,4-diol, unsaturated epoxides such as 1-vinylcyclohexane-3,4-epoxide, butadiene monooxide, vinyl glycidylether(1-vinyloxy-2,3-epoxy propane)glycidyl methacrylate and 3-allyloxypropylene oxide(allyl glycidylether), with acryloxy and methacryloxy being preferred and acryloxy being most preferred. Exemplary heteroatomic moieties are polyvalent moieties having at least one heteroatom selected from the group consisting of B, Al, Si, P, S, Ga, Ge, As, Se, In, Sn, Sb, Te, Tl, Pb, Bi, as well as various transition metals from Groups IB through VIII of Mendeleef's Periodic Table of Elements such as Ti, V, U, Fe, Co and Ni and including partial oxides thereof and provided that M is at least trivalent. Exemplary lyophilic moieties (A) are residues resulting from the reaction of a heteroatomic precursor monomer with an active hydrogen moiety of a polyahl or a monoahl as defined before.

Preferably, the ethylenically unsaturated adduct is represented by the formula:

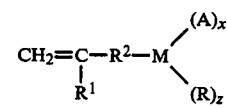

wherein $R^1$ is hydrogen, lower alkyl, aryl, halo, nitrilo, carboxyalkyl, alkylaryl, arylalkyl, and cycloalkyl, more preferably hydrogen or lower alkyl such as methyl, ethyl or propyl, most preferably hydrogen or methyl; $R^2$ is alkylene, arylene, alkylenearylene such as benzylene, or carboxyalkylene, most preferably carboxyalkylene wherein alkylene has 2 to 6 carbons such as carbonyloxyethylene; M is the tetravalent form of Si, Ti and P=O, most preferably Si; each R is independently hydrogen, alkyl, alkoxy, aryl, aryloxy or alkylaryl, most preferably alkyl; each A is independently the residue of a monoahl or a polyahl as defined hereinbefore; x is 1 to 4, most preferably 3; and z is 0 or 1 to 3, most preferably 0. The residue of the monoahl or polyahl is typically formed by the reaction of a polyahl or monoahl with a lower alkoxy or alkyl moiety of M whereby the active hydrogen of the polyahl or monoahl exchange with the lower alkoxy or alkyl moiety to form an alcohol or alkane and the residual polyahl or monoahl becomes covalently bonded to M. Most preferably, A is represented by $-OC_2H_{2n-\nu}OR^3$ wherein $R^3$ is hydrogen or alkyl, n is 1 to is 10 to 150, most preferably n is 2 and v is 20 to 100.

Exemplary preferred unsaturated adducts are $h_2C=C(CH_3)CO_2$ $CH_2CH_2CH_2Si(A)_3$, and $H_2C=C(CH_3)CO_2CH_2CH_2P(=O)(A)_2$, $)(A)_2$, wherein A is the residue of a glycerine-initiated polypropylene pylene polyol having a $M_n$ (number average molecular weight) in the range of 4500 to 5000 or a butanol-initiated ethyleneoxy/propyleneoxy polymer having a $M_n$ in the range of 2500 to 3000.

The ethylenically unsaturated adducts of this invention are advantageously prepared by reacting (1) a lower alkyl ester of the desired heteroatomic acid which is also covalently bonded to an active ethylenically unsaturated moiety sufficient to cause substitution of the ester moiety of the heteroatom with the monoahl, or polyahl residue or a mixture thereof. Examples of such lower alkyl esters include $H_2C=C(CH_3)CO_2CH_2CH_2CH_2Si(OCH_3)_3$, and similar compounds described in U.S. Pat. No. 4,216,303; $H_2C=C(CH_3)CO_2CH_2CH_2P(O)(OCH_3)_2$, $H_2C=CH-C_6H_4Si(OCH_3)_3$, $(CH_3O)_3SiCH_2CH_2C-H_2O_2CCH=CHCO_2CH_2CH_2CH_2Si(OCH_3)_3$ and $CH_2=CH-C_6H_4CH_2CH_2SI(OCH_3)_3$, with the methyl, ethyl and propyl esters of silicon being preferred. The procedures and conditions employed for this type of substitution or transesterification reaction are conventional as described in Plueddemann's "Silane Coupling Agents," Plenum (1982). The aforementioned esters of hetero-atomic acids as well as methods for their preparation are described in U.S. Pat. Nos. 3,878,263 and 4,216,303.

The copolymerizate of the adduct described hereinbefore is beneficially prepared by copolymerizing the adduct with other monomer(s) using polymerization techniques described hereinafter. The aforementioned reaction product may be formed by first copolymerizing a heteroatomic precursor monomer with another ethylenically unsaturated monomer. This polymer is then reacted with monoahl or polyahl to form the desired reaction product using the procedures and conditions described hereinbefore to react the hereroatomic monomer with the monoahl or polyahl.

The adduct, copolymerizate or reaction product is readily employed in preparing the copolymer dispersion by (1) mixing the polyahl and other ethylenically unsaturated monomer(s) and the adduct, the copolymerizate, reaction product or a mixture of adduct, reaction product and copolymerizate, and (2) subjecting the mixture to conditions of conventional addition copolymerization as exemplified hereinafter.

Suitable ethylenically unsaturated monomers (so-called "other monomers" or "other ethylenically unsaturated monomers") which are polymerized in the presence of the aforementioned unsaturated adduct and/or copolymerizate include aliphatic conjugated dienes such as butadiene and isoprene; monovinylidene aromatic monomers such as styrene, α-methyl styrene, ar-methyl styrene, ar-(t-butyl)styrene; ar-chlorostyrene, ar-cyanostyrene and ar-bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned mono-adduct, many of which have heretofore been employed in the formation of copolymer polyols as described in U.S. Pat. Nos. 3,823,201 and 3,383,351. It is understood that mixtures of two or more of the aforementioned "other monomers" are also suitably employed in making the copolymer. Of the foregoing "other monomers", the monovinylidene aromatic monomers, particularly styrene, and the ethylenically unsaturated nitriles, particularly acrylonitrile, are especially preferred.

In the preparation of the dispersion, the unsaturated adduct, reaction product and/or copolymerizate is employed in an amount sufficient to stabilize the dispersion of resulting polymer of "other monomer(s)" in the polyahl. Preferably, the amount of adduct, reaction product and/or copolymerizate is from about 0.0002 to about 30, most preferably from about 0.02 to about 5 weight percent, based on the weight of the dispersion. The amounts of polyahl and "other monomer(s)" employed are not particularly critical, and are usually about the same as in conventional copolymer dispersions. Generally, sufficient polyahl is used to constitute the continuous phase of the dispersion, preferably from about 50 to about 95, most preferably from about 60 to about 90, weight percent based on the dispersion. Preferably, the amount of "other monomer(s)" is from about 5 to about 50, most preferably from about 10 to about 45, weight percent based on the dispersion. The particular method of mixing the adduct, reaction product and/or copolymerizate, other monomer(s) and polyahl is not particularly critical. For example, a uniform mixture is easily achieved by conventional mixing means such as a simple mechanical stirrer.

The polymerization is readily carried out by simultaneously adding at a steady or constant rate a monomer(s) and a free radical catalyst to a mixture of unsaturated adduct, reaction product and/or copolymerizate and the polyahl under conditions sufficient to cause free radical addition polymerization. The temperature of the copolymerization is dependent upon the initiator and is preferably in the range from about 25° C. to about 190° C., most preferably from about 110° C. to about 130° C., when azo-type catalysts are used. Alternatively, the free radical catalyst may be dispersed in a portion of the polyahl and thereafter added along with monomer to the remaining portion of the polyahl containing the adduct, reaction product and/or copolymerizate. Other polymerization processes, both continuous and batch, may be suitably employed.

Suitably, the concentration of polymerization catalyst is any amount sufficient to cause copolymerization of the unsaturated adduct and the "other ethylenically unsaturated monomer(s)". Preferably, however, the concentration of catalyst is in the range from about 0.1 to about 20, more preferably from about 0.5 to about 5, weight percent based on the combined weight of the adduct and "other monomer(s)".

Catalysts suitably employed in the practice of the polymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) is preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

In preparing a polymer dispersion containing a combination (aforementioned combination (D)) of the aforementioned reaction product (C) and aforementioned copolymerizate (B) of the unsaturated adduct and "other monomer(s)", a dispersion containing the reaction prodcut and a dispersion of the copolymerizate (B), are physically mixed. A copolymer dispersion (aforementioned combination (E)) containing (1) one or both of the reaction product (C) and the copolymerizate (B) and (2) a polymer of "other monomer(s)" is advantageously prepared by first preparing a dispersion of the reaction product (C) and/or the copolymerizate (B) in the aforementioned polyahl (A) by one of the foregoing methods and then adding the "other monomer(s)" to the dispersion and subjecting the resulting formulation to polymerization conditions. The reaction product (C) and/or the copolymerizate (B) stabilize the resulting dispersion containing combination (E) in much the same manner as the polymeric stabilizer described in U.S. Pat. No. 4,148,840 stabilizes the copolymer dispersions described therein.

Any of the aforementioned polymer dispersions is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and/or pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polymer dispersion of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S Pat. No. 3,215,652.

The polymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the polymer dispersion is advantageously carried out in the presence of an amount of a urethane-type catalyst which is effective to catalyze the reaction of the polyahl of the polymer dispersion with the polyisocyanate. Preferably, the amount of urethane catalyst is an amount comparable to that used in conventional urethane-type reactions.

Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylene diamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

Into a 2-liter, 4-neck, round-bottom flask equipped with addition funnel, stirrer, condenser and thermocouple is charged 505.0 g (0.103 mole) of a glycerine-initiated polypropyleneoxy ethyleneoxy polyol (OH number of 34) (Polyol I). To the flask is then added with stirring 0.7 g (0.002 mole) of dibutyltin dilaurate (DBTDL) and 1.35 g (0.005 mole) of gamma-methacryloxypropyl trimethoxysilane (MAPS) under a static nitrogen purge. The resulting mixture is heated to 120° C. for 1.5 hours to form Unsaturated Adduct I,

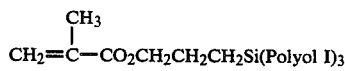

in excess Polyol I. At this time, a mixture of 125.5 g (1.16 moles) of styrene and 2.51 g (0.02 mole) of azobisisobutyronitrile (AZO) is added dropwise to the reaction vessel over an hour. After the addition is completed, heating of the reaction mixture at 120° C. is continued for 1 hour and then stripped of volatiles at <1 mm Hg and 120° C. for 2 hours. The resulting stable dispersion of styrene polymer in Polyol I has 0.05 mole of polymerized Unsaturated Adduct I per mole of Polyol I and a Brookfield viscosity (Model RV, spindle #3 at 10 rpm and 25° C.) of 2000 centipoise (cps).

Following the foregoing procedure except that 0.02 mole of Unsaturated Adduct I per mole of Polyol I is employed, the resulting styrene polymer dispersion has a Brookfield viscosity of 1450 cps.

EXAMPLE 2

Into a 500-ml, 3-neck, round-bottom flask equipped with an 8-inch coil condenser and a coated magnetic stir bar is added with stirring 0.01 g of phenothiazine, 200.0 g (0.07 mole) of a butanol-initiated propyleneoxy/ethyleneoxy polymer (Monol I), 3.0 g (0.005 mole) of DBTDL and 5.9 g (0.024 mole) of MAPS. This mixture is heated with stirring at 90° C. for 6 hours to produce Unsaturated Adduct II,

Into a 2-liter, 4-neck flask equipped with a 250-ml long stem, pressure equilizing addition funnel, an 8-inch reflux condenser, a thermometer and a mechanical stirrer having a 3-inch paddle, is added 500.0 g (0.103 mole) of a Polyol I and 45.1 g (0.005 mole) of Unsaturated Adduct II. Under a static flow of nitrogen, the contents of the reaction flask are stirred and heated to 120° C. Over a period of 1.5 hours, 137.3 g (1.27 moles) of styrene containing 2.75 g (0.02 mole) of 2,2'-azobis(2-methylpropionitrile) (AZO) is added dropwise to the reaction flask. After addition is complete, the reaction mixture is heated at 120° C. for 1 hour and then stripped of volatiles at <1 mm Hg and 120° C. for 2 hours. The resulting styrene polymer dispersion is stable and has 0.05 mole of polymerized Unsaturated Adduct II per mole of Polyol I and a Brookfield viscosity of 1630 cps.

Following the foregoing procedure except that 20.0 g (0.02 mole/mole of Polyol I) and 125.0 g (0.13 mole/mole of Polyol I) of Unsaturated Adduct II is employed, the resulting styrene polymer dispersions have Brookfield viscosities of 1420 cps and 1430 cps, respectively.

EXAMPLE 3

Into the apparatus described in Example 1 is charged 509.0 g (0.103 mole) of Polyol I. To the flask is then added with stirring 0.06 g (0.1 mmole) DBTDL and 0.25 g (0.002 mole) MAPS under a static nitrogen purge. The resulting mixture is heated to 120° C. for 1½ hours to form Unsaturated Adduct I in excess Polyol I. At this time, a reaction mixture of 87.5 g (0.84 mole) of styrene, 37.5 g (0.71 mole) of acrylonitrile and 2.5 g (15.4 moles) of AZO was added dropwise to the reaction vessel over a 1½-hour period. After the addition is completed, heating of the reaction mixture to 120° C. is continued for 1 hour and then it is stripped of volatiles at <1 mm Hg and 120° C. for 2 hours. The resulting stable dispersion of styrene/acrylonitrile (SAN) copolymer in Polyol I has 0.01 mole of polymerized Unsaturated Adduct I per mole of Polyol I and a Brookfield viscosity (Model RV, spindle #3 at 10 rpm and 25° C.) of 2064 cps.

Following the foregoing procedure except that 0.002, 0.005, 0.010 and 0.015 mole of Unsaturated Adduct I in Polyol I are employed, the resulting SAN copolymer dispersions have Brookfield viscosities of 1974, 2249, 2196 and 2694 cps, respectively.

What is claimed is:

1. An ethylenic addition polymerizable adduct comprising an ethylenically unsaturated moiety bound through a heteroatomic moiety to at least one lyophilic moiety wherein said adduct in polymerized form is capable of stabilizing a dispersion of a lyophobic polymer in a continuous nonaqueous liquid phase, said lyophilic moiety being the residue of a polyahl having a Mn of at least 200.

2. The adduct of claim 1 which is represented by the formula:

U(M(A)$_x$(R)$_z$)$_y$ wherein U a is ethylenically unsaturated moiety; M is a heteroatomic polyvalent moiety containing at least one heteroatom selected from the group consisting of Si, Ti or P, and oxides of said heteroatoms; each A is independently a lyophilic moiety resulting from the reaction of an active hydrogen moiety of a polyahl with a moiety containing said heteroatom to form a covalent bond between the heteroatom and the resulting residue of the polyahl; each R is independently hydrogen or an organic moiety covalently bonded to said heteroatom; x is an integer from 1 to 5; z is 0 or an integer from 1 to 4 and y is an integer from 1 to 2.

3. The adduct of claim 1 represented by the formula:

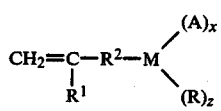

wherein $R^1$ is hydrogen or lower alkyl; $R^2$ alkylene, arylene, alkylenearylene or carboxyalkylene; M is the tetravalent form of Si, Ti or P=O; each A is independently the residue of a polyether poly; each R is independently hydrogen, alkyl, alkoxy, aryloxy, aryl or arylalkyl; x is an integer from 1 to 3; and z is 0.

4. An adduct selected from the group consisting of H$_2$C=C(CH$_3$)CO$_2$CH$_2$CH$_2$CH$_2$SI(A)$_3$ and H$_2$C=C(CH$_3$)CO$_2$CH$_2$CH$_2$P(=O)(A)$_2$ wherein A is the residue of a glycerine-initiated polypropylene polyol having a Mn in the range of 4500 to 5000.

5. An adduct represented by the formula:

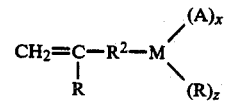

wherein $R^1$ is hydrogen or lower alkyl; $R^2$ is alkylene, arylene, alkylenearylene or carboxyalkylene; M is the tetravalent form of Si, Ti or P=O; each A is independently the residue of a polyether polyol, said residue represented by the formula C$_n$H$_{2n}$O—$_v$R$^3$ wherein $R^3$ is hydrogen, n is 1 to 5 and v is 10 to 150; each R is independently hydrogen, alkyl, alkoxy, aryloxy, aryl or arylalkyl; x is an integer from 1 to 3; and z is 0.

6. The adduct of claim 5 wherein v is 20 to 100.

* * * * *